(12) United States Patent
Guerin et al.

(10) Patent No.: US 11,921,358 B2
(45) Date of Patent: Mar. 5, 2024

(54) BISTABLE SPECTACLES KNUCKLE

(71) Applicants: Christophe Guerin, Lille (FR);
Jérémie Plazy, Lyons (FR)

(72) Inventors: Christophe Guerin, Lille (FR);
Jérémie Plazy, Lyons (FR)

(73) Assignee: LUXOTTICA S.R.L., Agordo (IT)

( * ) Notice: Subject to any disclaimer, the term of this patent is extended or adjusted under 35 U.S.C. 154(b) by 646 days.

(21) Appl. No.: 17/043,818

(22) PCT Filed: Feb. 14, 2019

(86) PCT No.: PCT/FR2019/050332
§ 371 (c)(1),
(2) Date: Oct. 20, 2020

(87) PCT Pub. No.: WO2019/186001
PCT Pub. Date: Oct. 3, 2019

(65) Prior Publication Data
US 2021/0033884 A1      Feb. 4, 2021

(30) Foreign Application Priority Data

Mar. 30, 2018   (FR) .................................. 1852843

(51) Int. Cl.
G02C 5/22      (2006.01)
(52) U.S. Cl.
CPC ......... G02C 5/2209 (2013.01); G02C 5/2254 (2013.01)
(58) Field of Classification Search
USPC ............................................ 351/153; 16/228
See application file for complete search history.

(56) References Cited

U.S. PATENT DOCUMENTS

| 4,345,848 A * | 8/1982 | Cheselka ............ G02C 5/2281 16/228 |
| 5,596,789 A * | 1/1997 | Simioni ............... G02C 5/2209 16/224 |

(Continued)

FOREIGN PATENT DOCUMENTS

| EP | 1376201 A1 | 1/2004 |
| FR | 2698121 A1 | 5/1994 |

(Continued)

OTHER PUBLICATIONS

International Search Report dated Apr. 15, 2019 re: Application No. PCT/FR2019/050332, pp. 1-2, citing: U.S. Pat. No. 5,596,789 A, WO 9215916 A1, US 2015085244 A1, US 2005270478 A1, US 2012127423 A1 and FR 2698121 A1.

(Continued)

*Primary Examiner* — Darryl J Collins
(74) *Attorney, Agent, or Firm* — CANTOR COLBURN LLP

(57) ABSTRACT

A bistable hinge element for an eyeglasses frame, which includes a temple cage having a bottom extended laterally by two longitudinal side walls which define a housing that opens onto the proximal transverse face through an opening that is U-shaped in cross-section. The hinge element further includes a front cage which has a bottom extended laterally by two longitudinal side walls which define a housing that opens onto the proximal transverse face through an opening that is U-shaped in cross-section, and a solid body that is elastically deformable along the longitudinal axis, and which has a central portion, with a cross-section corresponding to the transverse cross-section of the U-shaped openings, which is extended at each end by a bulge of a cross-section that is complementary to the transverse cross-section of the housings of the temple and front cages.

11 Claims, 6 Drawing Sheets

(56) References Cited

U.S. PATENT DOCUMENTS

| | | | |
|---|---|---|---|
| 6,168,341 B1 * | 1/2001 | Chene | E05D 11/1064 |
| | | | 351/153 |
| 2005/0270478 A1 | 12/2005 | Curci et al. | |
| 2012/0127423 A1 | 5/2012 | Blum et al. | |
| 2015/0085244 A1 | 3/2015 | Carter | |

FOREIGN PATENT DOCUMENTS

| | | | |
|---|---|---|---|
| FR | 2959573 A1 | 11/2011 | |
| JP | 3579674 B2 | 7/2004 | |
| JP | 3990048 B2 | 7/2007 | |
| JP | 4073007 B2 | 2/2008 | |
| JP | 4173175 B2 | 8/2008 | |
| WO | 9215916 A1 | 9/1992 | |

OTHER PUBLICATIONS

Japanese Office Action dated Dec. 16, 2022, for Japanese Application No. 2020-554535, 5 pages, English Translation.
Japanese Office Action dated Aug. 8, 2023, for Japanese Application No. 2020-554535, 6 pages, with English Translation.
Japanese Office Action dated Nov. 24, 2023, for Japanese Application No. 2020-554535, 10 pages, with English Translation.

* cited by examiner

BISTABLE SPECTACLES KNUCKLE

TECHNICAL FIELD

The present disclosure relates to eyeglasses of the type constituted by a front with optical or sunglass lenses, and two temples, each one of which is connected to the front via the use of an elastic joint. This type of joint achieves a bistable effect of the temple, as a consequence keeping it in the open or closed position, without freely oscillating from one to the other as is the case with a traditional joint.

This system also makes it possible to compensate for opening the temples too far, and so prevent the breakage or a plastic deformation thereof.

BACKGROUND

There is a solution in the background art which is described in European patent EP1376201, which relates to a pair of eyeglasses provided with elastic hinges each one of which joins an eyeglasses front to a respective eyeglasses temple. The elastic hinge comprises a block of elastic elastomer that can bend between two positions about 90° apart. The elastic hinge is connected to each one of the ends by way of a retention ridge that engages in a corresponding groove of the first eyeglasses temple or of the eyeglasses face.

There is also a solution described in French patent FR2959573, which relates to eyeglasses constituted by a front with optical or sunglass lenses and comprising two temples, each one of which is connected to the frame. The joint is constituted by a solid, single-piece, elastically-deformable element which is interposed between one end of the temple and a facing end through a pin, by way of connecting means.

International patent application WO9215916 describes another example of a hinge for the temples of an eyeglasses frame and other frames which comprises conical, convex and concave hinge elements that fit together and are kept in contact by elastic elongated elements that allow a relative movement of the hinge elements when they are placed under strain and which return the elements back to their normal contact position when the strain ceases.

US patent application US2015085244 describes an eyeglasses frame with a fixing system that employs a bulging metallic body of the "stemball" type (commercial name).

US patent application US2005/270478 relates to a hinge assembly for eyeglasses, in which a first structural element for the hinge structure is formed in a first molding stage and a second structural element of the hinge structure is formed directly on a part of the first structural element in a second molding stage. The disclosure uses mold assembly techniques to reduce the number of assembly steps necessary to form this ensemble hinge, which makes it possible to create a hinge assembly that offers an improved fit and usefulness. More specifically, the overmolded components form a joint of the interlocking type, and a ball, which increases the degree of lateral rotation in one direction and allows a limited freedom in a second direction.

US patent application US2012127423 relates to another known example of eyeglasses that have a joint with an elastic connector.

U.S. Pat. No. 5,596,789 describes a hinge that enables rapid and simple mounting on the parts that make up the pair of eyeglasses, so as to enable better industrialization. This hinge of the background art is not in the least bistable.

FIG. 11 shows a variation comprising a rigid body provided with two ball joints which are accommodated in complementary parts which are inserted into the temple at one end and the front at the other.

These parts are laterally deformable in order to allow snap-engagement in reception cavities provided in the temples and the front, and not along the axis of the rigid body.

The solutions in the background art are based on the elastic deformation of a plastic element subjected to a torsion force. This method of deformation leads to rapid fatigue of the plastic element, which firstly loses its elastic characteristics through a non-reversible elongation, resulting in a play in the joint. Secondly, this material fatigue leads to breakage.

In addition, assembly of these eyeglasses frames is not easy because it is necessary to place the elastic element under tension at the time of assembly, which implies delicate handling.

The disclosure relates to a bistable hinge solution with an elastically deformable body and a structure of cages for accommodating the ends of this elastic body which do not correspond to the teaching of D1.

SUMMARY

In order to overcome these drawbacks, the disclosure in its most general embodiment relates to a bistable hinge element for an eyeglasses frame, which comprises:
- a temple cage which has a bottom which is extended laterally by two longitudinal side walls which define a housing that opens onto the proximal transverse face through an opening that is U-shaped in cross-section, each one of said side walls having an upper lip which extends from said proximal transverse face to an intermediate portion of said housing, said lips delimiting a gap the width of which corresponds to the width of said U-shaped opening,
- a front cage which has a bottom which is extended laterally by two longitudinal side walls which define a housing that opens onto the proximal transverse face through an opening that is U-shaped in cross-section, each one of said side walls having an upper lip which extends from said proximal transverse face to an intermediate portion of said housing, said lips delimiting a gap the width of which corresponds to the width of said U-shaped opening,
- said proximal faces having complementary guiding segments, which are perpendicular to the plane of said gap, said guiding segments of the front cage being extended on the surface of said lips by guiding segments that extend from one side to the other of said gap, over a length that corresponds to the height of the proximal face of the temple cage,
- a solid body that is elastically deformable along the longitudinal axis, and which has a central portion, with a cross-section corresponding to the transverse cross-section of said U-shaped openings, which is extended at each end by a bulge of a cross-section that is complementary to the transverse cross-section of said housings of the temple and front cages.

According to advantageous variations, the disclosure also relates to a hinge element that has one or more of the following additional characteristics:
- the displacement between the open position and the folded position is 80°±5°, the height, along the direction perpendicular to the plane of the gap, of the central portion of said monolithic body is comprised between 80% and 100% of the height of said bulges, the width of said bulges, along the transverse direction, is comprised between 1.5 and 2.5 times the width of said central portion of said monolithic body, the at least one of said bulges forms side bumps that have a revolution path about an axis that is perpendicular to said side walls, the at least one of said bulges defines cylindrical side bumps, the at least one of said bulges has a hemispherical shape, said complementary guiding segments are partially curved.

The disclosure also relates to an eyeglasses frame made up of a front and two temples, the temples being folded to the front with a hinge element according to the disclosure.

BRIEF DESCRIPTION OF THE DRAWINGS

The present disclosure will be better understood from reading the detailed description that follows of a non-limiting example of the disclosure, with reference to the accompanying drawings wherein.

DETAILED DESCRIPTION OF THE DRAWINGS

Figure 1:
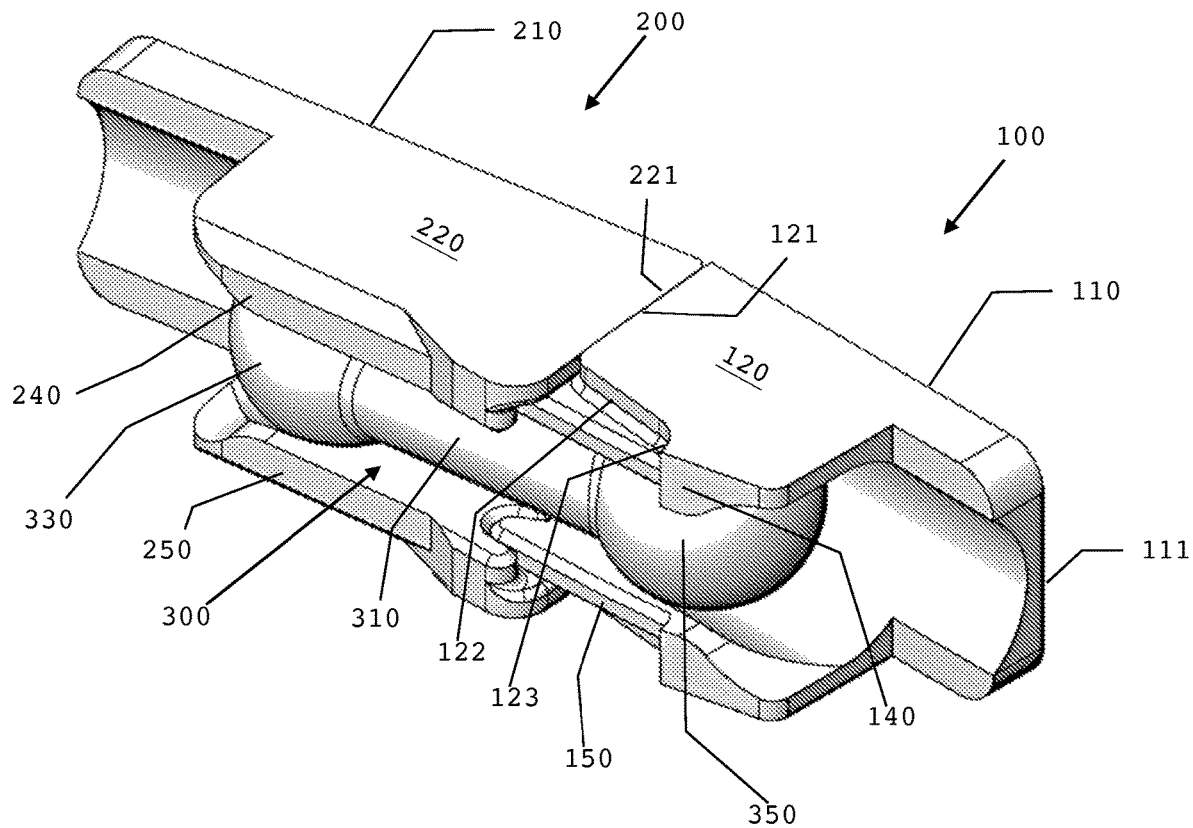
FIG. 1 is a partially cutaway perspective view of the hinge according to the disclosure, in the open position.

FIG. 1 is a partially cutaway overall view of the hinge, in the open position. It is made up of three components:
a front cage (100),
a temple cage (200),
an elastic body (300).

The two cages (100, 200) are constituted by metallic parts, for example in an alloy of copper or nickel silver.

In the open position, the longitudinal axis (110) of the plane passing through the bottom (111) of the front cage (100) forms, with the longitudinal axis (210) of the plane passing through the bottom of the temple cage (200), an angle slightly smaller than 180°, typically 170°, so that the temples of the frame tend to travel slightly "inward" and exert a slight pressure on the side of the head, in order to ensure a good hold.

The elastic body (300) is a solid monolithic piece made of elastomer, for example polyurethane with a Shore hardness of 95 A, with a central portion (310) that extends to each end through a bulge (330, 350).

According to this first variation of embodiment of an elastic body, the ends (330, 350) have a hemispherical shape, with a central portion (310) which has a rounded parallelepiped shape.

This elastic body (300) is accommodated in the cavity defined inside the two cages (100, 200), and the bulges (330, 350) are blocked by lips (140, 150; 240, 250) which extend respectively on the planes parallel to the planes that pass through the bottoms (111, 211) and which between their inner edges define a gap of a width that corresponds to the transverse cross-section of the central portion (310) of the elastic body (300).

The height of the body (300), according to the vertical axis perpendicular to the plane of the gap, is preferably comprised between 70% and 100% of the maximum height, so as to reduce bending of the central portion. The distance between the barycenters of the two bulges (330, 350) is comprised between 65% and 75% of the total length of the body (300), so as to have a short and thick central portion that also limits bending.

The side faces (120, 220) of the cages (100, 200) have complementary proximal edges (121, 221) which form sliding surfaces. The height $h_{front}$ of the edge (121) of the front cage (100) is smaller than the height $h_{temple}$ of the edge (221) of the temple cage (200). Typically, $h_{front}$ is comprised between 0.7 and 0.85 times $h_{temple}$. The sliding surface (121) of the front cage (100) is extended by a sliding surface (122), which extends at 100° to the sliding surface (121) and has a length that corresponds substantially to the height $h_{front}$ of the edge (121). When the hinge is closed, the edge (221) begins to slide along the length of the edge (121), up to a pivot point where it continues to slide along the length of the surface (122), until it arrives in abutment against the stop (123) that extends substantially perpendicularly to the surface of the sliding surface (122).

Figure 2:
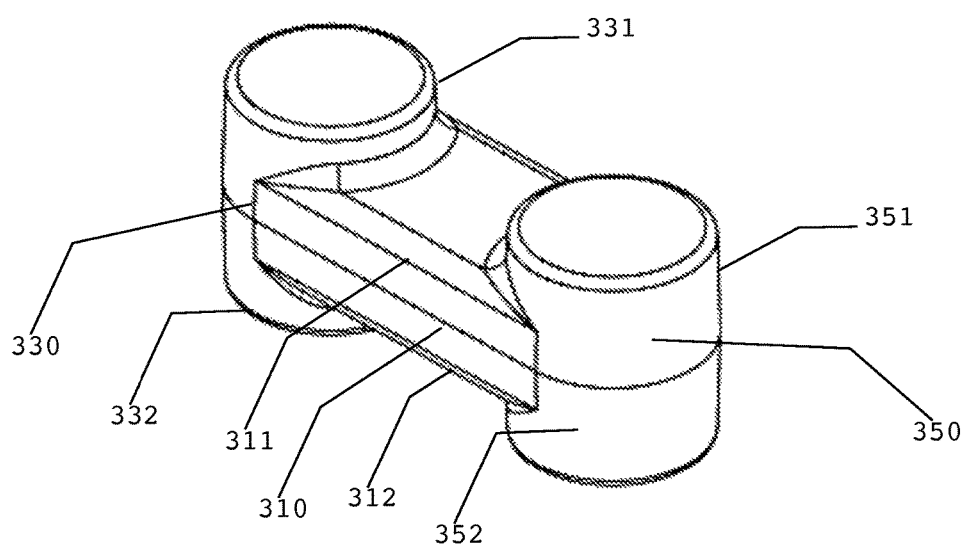
FIG. 2 is a perspective view of a variation of embodiment of the elastic body for such a hinge.

FIG. 2 is a perspective view of a variation of embodiment of the elastic body for such a hinge. According to this variation of embodiment, the ends (330, 350) have a cylindrical shape, and the central portion (310) has a substantially rectangular shape.

The width of the central portion (310) is comprised between 0.5 and 0.6 times the width of the ends (330, 350). The ends (330, 350) also have, on either side of the central portion, cylindrical shoulders (332; 351, 352) which have a width of around 0.25 times the width of the cylindrical shoulders, forming a pivot region in the housings formed inside the cages (100, 200).

The central portion (310) has, at these longitudinal stops, bevels (311, 312) which facilitate the passage of the cages (100, 200) inside the gap. Naturally, the central portion (310) usefully has longitudinal bevels, whatever the configuration of the bulges (330, 350).

This elastic body is stressed, at the time of opening or closing, in traction and not in torsion, under normal usage, that is to say when the temples are folded or closed or when the eyeglasses are being worn.

However, in the event of abnormal usage, for example if the temples are twisted, the elastic body can absorb deformations via an occasional bending of the central body.

Figure 3:
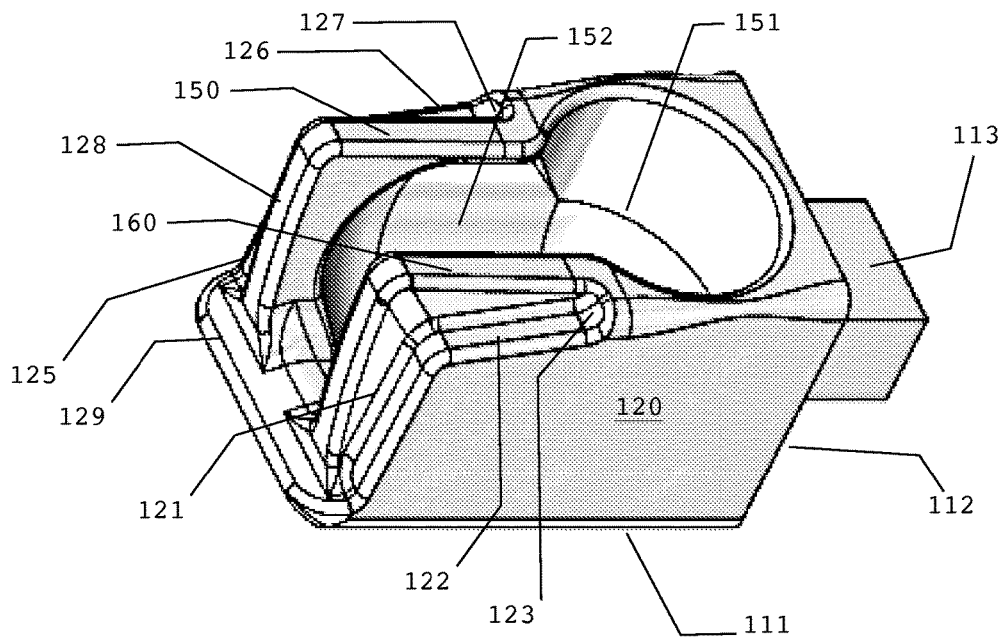
FIG. 3 is a perspective view of a front cage.
Figure 4:
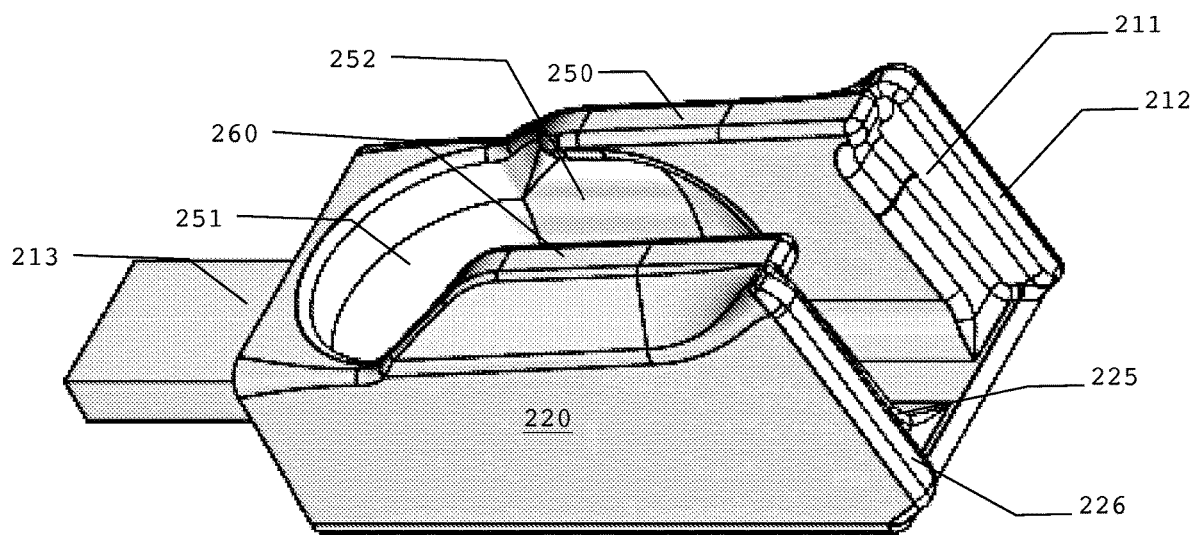
FIG. 4 is a perspective view of a temple cage.
Figure 5:
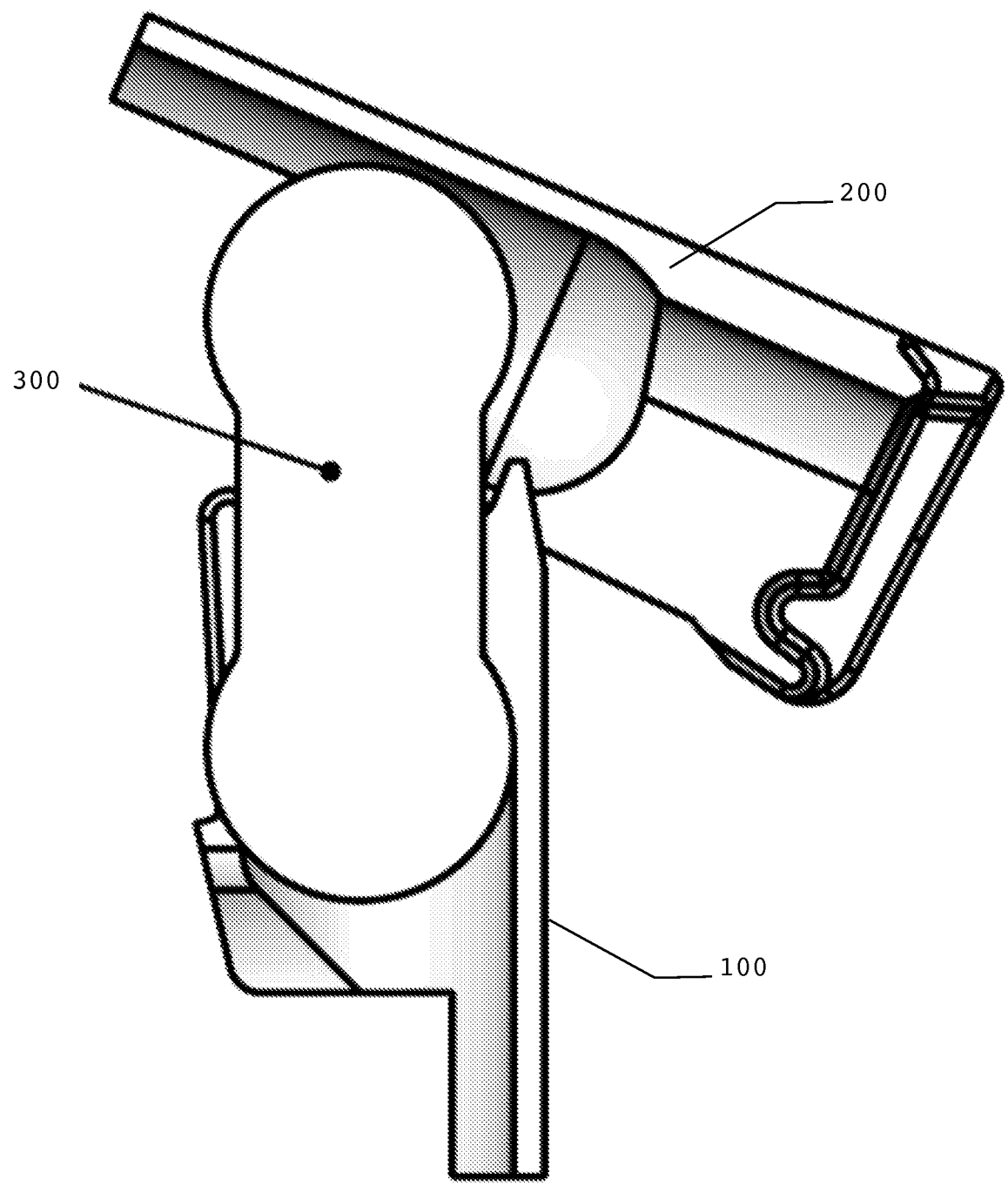
FIGS. 5 to 10 show the configuration of the hinge from the step of insertion of the elastic body into the cages to the complete opening.
Figure 6:
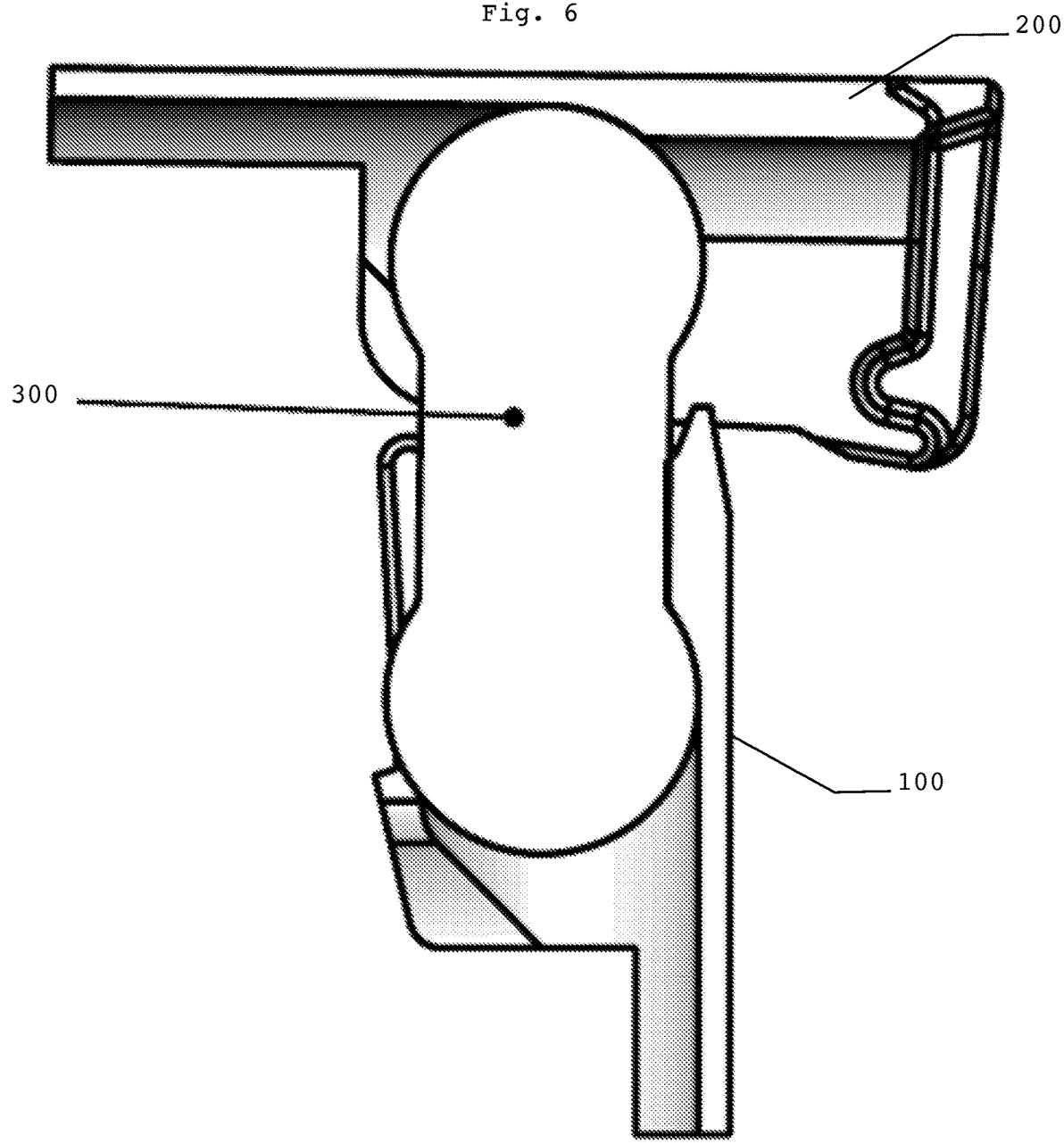
Figure 7:
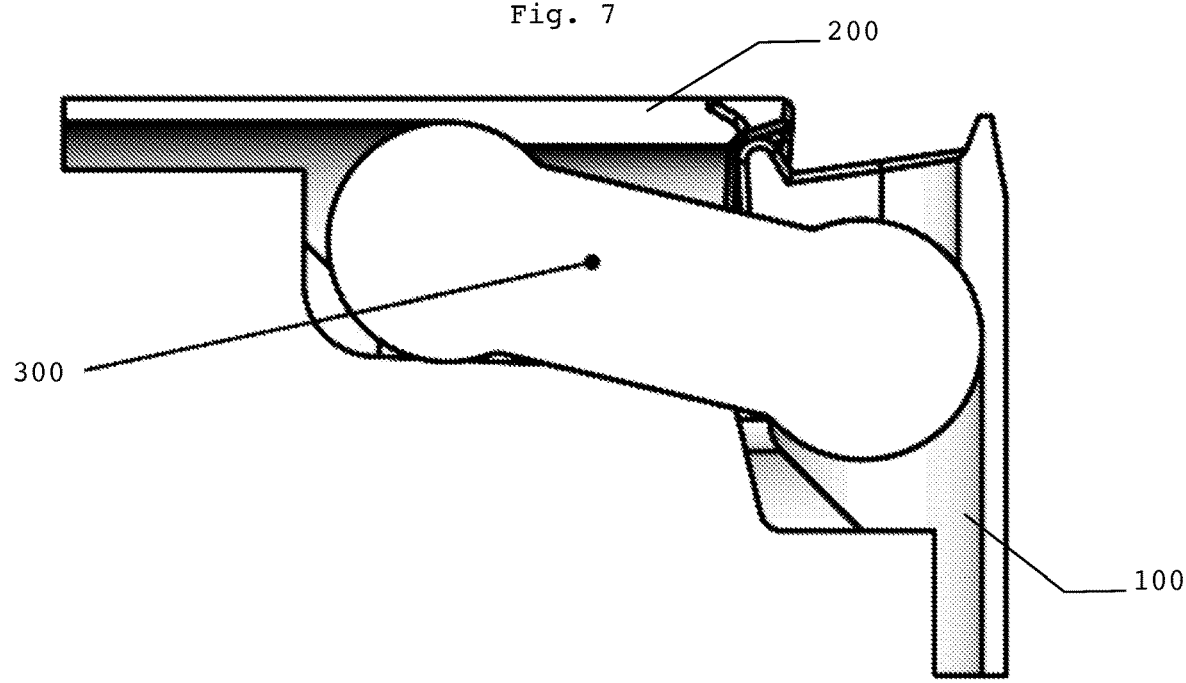
Figure 8:
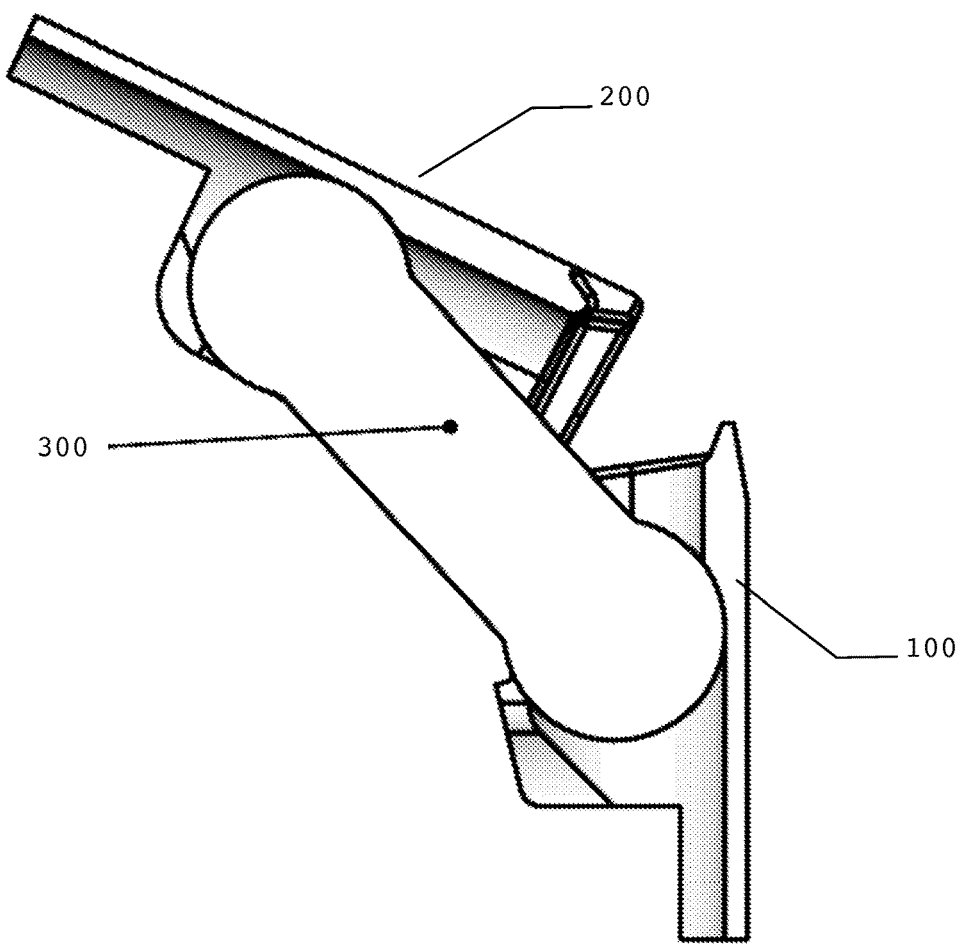
Figure 9:
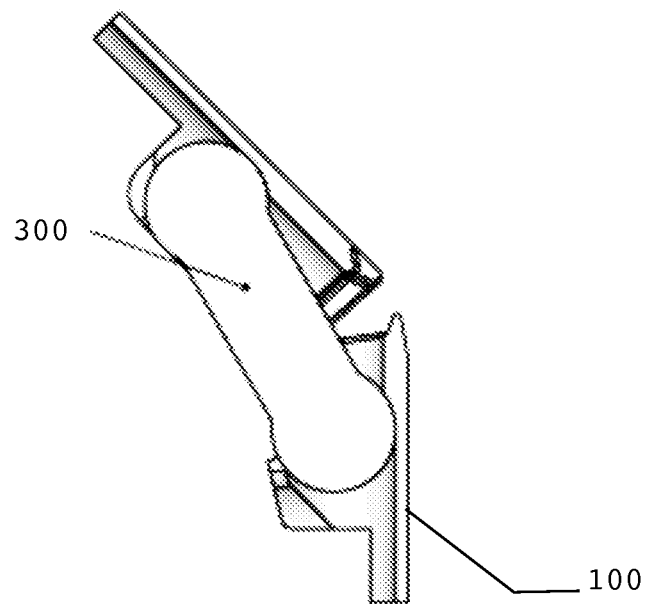
Figure 10:
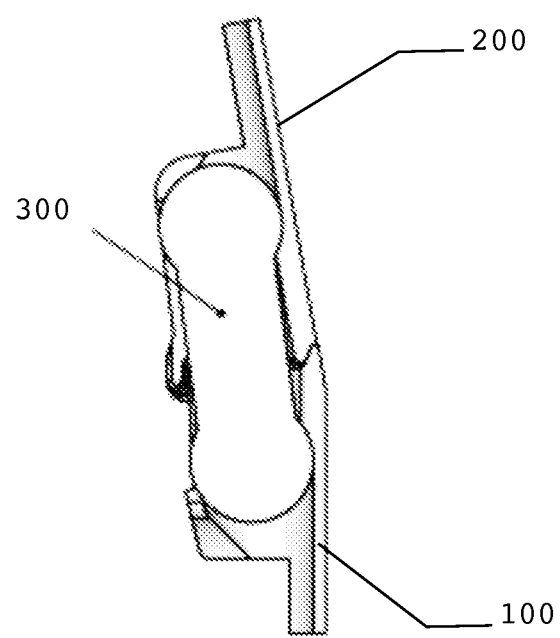

FIGS. 3 and 4 are detailed perspective views of the front and temple cages respectively.

The front of the frame is fixed on the front surface (112), perpendicular to the longitudinal axis, for example with the aid of a pin (113).

The cage (100) has, on the face opposite the front face (112), runners (121, 125) which are extended onto the internal stop by runner segments (122, 126) which extend perpendicularly and are terminated by abutments (123, 127). The runners are bordered internally by a rail (122, 128).

The external face (111) is extended by a spoiler (129).

The cage (100) has a cavity (151) with a cross-section greater than that of the bulge (330) of the elastic body (300), leading to a rear cavity (152) which opens onto the rear face through an opening that has a cross-section that corresponds to the cross-section of the central portion (310) of the elastic body (300).

The rear cavity (152) has a cross-section that corresponds to the cross-section of the bulge (330) of the elastic body (300), and is delimited by the two lips (150, 160) which delimit a median gap with a width that corresponds to the width of the central portion (310) of the elastic body (300).

The temple cage (200) is mounted in the prolongation of the temple of the eyeglasses, for example by a pin (213). It has, at the proximal face, two runners (211, 225) which are bordered by rails (212, 226) which are complementary to the runners of the front cage (100).

The term "proximal" in the present patent is used to mean the side of a cage nearest to the complementary cage.

It has a cavity (251) with a cross-section greater than the cross-section of the bulge (350) of the elastic body (300), which is prolonged by a cavity (252) with a cross-section complementary to the cross-section of the bulge (350) of the elastic body (300) and partially closed, on the inner face, by two lips (250, 260) which delimit a median gap.

FIGS. 5 to 10 show the configuration of the hinge from the step of insertion of the elastic body into the cages to the complete opening.

The hinge elements according to the disclosure can be adapted to ensure the transmission of electricity between each of the temples and the front of the eyeglasses.

To this end, the deformable solid body has a longitudinal canal for the passage of one or more electrical conductors, thus ensuring the electrical connection between the temple cage at one end and the front cage at the other. The connection can be ensured by the metalization of a part of the bulges that comes into contact with the temple cage and/or the front cage.

It can also be provided by metallic ridges that mutually engage in the complementary openings formed in the longitudinal side walls of the temple cage and/or the front cage, the front metallic ridge being connected to the temple metallic ridge by a conducting wire.

The solid body can equally be made of a material with conducting fibers embedded therein.

It can also be provided by overmolding on a longitudinally-deformable conducting wire.

The invention claimed is:

1. A bistable hinge element for an eyeglasses frame, the bistable hinge element comprises:
   a temple cage having a temple bottom extended laterally by two longitudinal side walls which define a housing that opens onto a proximal transverse face through an opening that is U-shaped in cross-section, each one of said side walls having an upper lip extending from said proximal transverse face to an intermediate portion of said housing, said upper lips delimiting a gap the width of which corresponds to the width of said U-shaped opening,
   a front cage having a front bottom which is extended laterally by two longitudinal side walls which define a housing that opens onto the proximal transverse face through an opening that is U-shaped in cross-section, each one of said side walls having an upper lip which extends from said proximal transverse face to an intermediate portion of said housing, said upper lips delimiting a gap the width of which corresponds to the width of said U-shaped opening,
   said proximal faces having complementary guiding segments, that define sliding surfaces, which are perpendicular to the plane of said gap, said guiding segments of the front cage being extended on the surface of said upper lips by guiding segments, that define sliding surfaces, that extend from one side to the other of said gap, over a length that corresponds to the height of the proximal face of the temple cage, and
   a solid body that is elastically deformable along the longitudinal axis, and which has a central portion, with a cross-section corresponding to the transverse cross-section of said U-shaped openings, which is extended at each end by a bulge of a cross-section that is complementary to the transverse cross-section of said housings of the temple and front cages, said bistable hinge element achieving a bistable effect of the temple, keeping said temple in the open or closed position, without freely oscillating from one position to the other.

2. The bistable hinge element according to claim 1, wherein a displacement between an open position and a folded position is 80°±50.

3. The bistable hinge element according to claim 1, wherein the height, along the direction perpendicular to the plane of the gap, of the central portion of said solid body is comprised between 80% and 100% of the height of said bulges.

4. The bistable hinge element according to claim 1, wherein the width of said bulges, along the transverse direction, is comprised between 1.5 and 2.5 times the width of said central portion of said solid body.

5. The bistable hinge element according to claim 1, wherein the at least one of said bulges forms side bumps that have a revolution path about an axis that is perpendicular to said side walls.

6. The bistable hinge element according to claim 1, wherein the at least one of said bulges defines cylindrical side bumps.

7. The bistable hinge element according to claim 1, wherein the at least one of said bulges have a hemispherical shape.

8. The bistable hinge element according to claim 1, wherein said complementary guiding segments are partially curved.

9. An eyeglasses frame made up of a front and two temples, the temples being folded to the front with a hinge element according to claim 1.

10. The eyeglasses frame according to claim 9, wherein the deformable solid body of said hinge elements has a longitudinal canal for the passage of one or more electrical conductors, ensuring the electrical connection between the temple cage at one end and the front cage at the other.

11. A bistable hinge element for an eyeglasses frame, the bistable hinge element comprises:
   a temple cage having a temple bottom extended laterally by two longitudinal side walls which define a housing that opens onto a proximal transverse face through an opening that is U-shaped in cross-section, each one of said side walls having an upper lip extending from said proximal transverse face to an intermediate portion of said housing, said upper lips delimiting a gap the width of which corresponds to the width of said U-shaped opening,
   a front cage having a front bottom which is extended laterally by two longitudinal side walls which define a housing that opens onto the proximal transverse face through an opening that is U-shaped in cross-section, each one of said side walls having an upper lip which extends from said proximal transverse face to an intermediate portion of said housing, said upper lips delimiting a gap the width of which corresponds to the width of said U-shaped opening, said proximal faces having complementary guiding segments, which are perpendicular to the plane of said gap, said guiding segments of the front cage being extended on the surface of said upper lips by guiding segments that extend from one side to the other of said gap, over a length that corresponds to the height of the proximal face of the temple cage, and a solid body that is elastically deformable along the longitudinal axis, and which has a central portion, with a cross-section corresponding to the transverse cross-section of said U-shaped openings, which is extended at each end by a bulge of a cross-section that is complementary to the transverse cross-section of said housings of the temple and front cages, wherein the at least one of said bulges forms side bumps that have a revolution path about an axis that is perpendicular to said side walls.

* * * * *